United States Patent [19]

Abu-Isa et al.

[11] Patent Number: 4,559,688
[45] Date of Patent: Dec. 24, 1985

[54] BONDING EPDM GASKETS TO FILLED NYLON HEAT EXCHANGER PARTS

[75] Inventors: Ismat A. Abu-Isa, Rochester; Chen-Shih Wang, Sterling Heights, both of Mich.; Daniel P. McCarthy, Lockport; David W. Patterson, E. Lockport, both of N.Y.

[73] Assignee: General Motors Corporation, Detroit, Mich.

[21] Appl. No.: 544,558

[22] Filed: Oct. 24, 1983

[51] Int. Cl.[4] .............................................. B23P 15/26
[52] U.S. Cl. ................................ 29/157.3 R; 264/255; 264/259; 29/157.4; 156/334; 427/393.5; 427/207.1
[58] Field of Search ................................ 165/173, 176; 29/157.3 F, 157.4; 261/255, 259, 250, 331.13; 156/334; 427/393.5

[56] References Cited

U.S. PATENT DOCUMENTS

| 4,041,594 | 8/1977 | Chartet | 29/157.3 C |
| 4,052,496 | 10/1977 | Goodfellow | 264/255 X |
| 4,070,219 | 1/1978 | Parnam | 427/393.5 |
| 4,121,963 | 10/1978 | Yardley et al. | 264/331.13 X |

FOREIGN PATENT DOCUMENTS

| 2558406 | 8/1976 | Fed. Rep. of Germany | 264/255 |
| 1423541 | 2/1976 | United Kingdom | 264/259 |

OTHER PUBLICATIONS

Rubber Chemistry and Technology, vol. 43, (1970), pp. 424–431.
R. W. Tomlinson, "Improved Adhesion of EPDM Sulphur Vulcanizates to RFL-Treated Fabrics," May 7, 1982.

Primary Examiner—Mark Rosenbaum
Assistant Examiner—John T. Burtch
Attorney, Agent, or Firm—George A. Grove

[57] ABSTRACT

Dicumyl peroxide-dimaleimide cured EPDM elastomers can be molded to molded nylon articles so that the EPDM strongly adheres to the nylon. This practice is particularly useful in molding EPDM gaskets to nylon heat exchanger tanks.

3 Claims, 3 Drawing Figures

BONDING EPDM GASKETS TO FILLED NYLON HEAT EXCHANGER PARTS

This invention relates to bonding ethylenepropylene-diene monomer rubber (hereinafter sometimes "EPDM") to molded nylon substrates. More specifically, and in a particularly useful embodiment, this invention relates to a method of assembling an EPDM gasket between a molded nylon heat exchanger tank and a metal heat exchanger tube header.

Composite automotive heat exchangers, such as radiators or heater cores, are sometimes made having a molded nylon tank portion and a metal core portion of various constructions. The core portion is typically aluminum or copper/brass. A suitable gasket material is interposed between the nylon tank and the core, and the assembly is mechanically held together. Typically, tabs at the periphery of the tube header are crimped around a shoulder of the molded nylon tank. The gasket is compressed between the tank and the header to provide a suitable seal for the ethylene glycol base coolant.

EPDM gaskets are very useful in the automotive heat exchanger environment. The gaskets are made by transfer molding and cured. A difficulty arises in assembling the composite structure. The gasket is thin, flexible and difficult to place and maintain in position until the tank is attached to the header. It would be desirable if the EPDM gasket could be prebonded to the molded nylon tank to facilitate the assembly of the heat exchanger.

EPDM elastomers are terpolymers of ethylenepropylene and a suitable diene monomer. Examples of suitable diene monomers are 1,4-hexadiene, dicyclopentadiene and ethylidenenorbornene (ENB). Perhaps the most widely used diene in current commercial elastomer practice is ENB which gives poly(ethylene-co-propylene-co-ENB). A representative EPDM polymer nominally contains 50 parts by weight ethylene, 45 parts propylene and 5 parts ENB. The use of the diene monomer produces a resulting terpolymer that can be crosslinked or cured. Sulfur curing agents and accelerators, such as are used to cure natural rubber, are commonly used to cure EPDM. Peroxide curing agents have also been employed. While EPDM elastomers are strong, durable materials and serve well in automotive heat exchangers, such compositions are not particularly adherent to other materials such as molded nylon.

It is an object of our invention to provide an EPDM composition that can be applied to and cured on molded nylon to form a strong, adherent bond therewith. The formulation is particularly adherent to nylon 6/6, nylon 6 and nylon 11. The nylons may be filled with chopped glass fibers or other suitable fillers, or they may be unfilled.

It is another and more specific object of our invention to provide a method of assembling a composite heat exchanger of the type comprising a metal tube header, an EPDM gasket, and a molded glass-filled nylon tank. Our improvement is to mold a specific EPDM curing system formulation onto the tank so that a gasket is formed which adheres to it and greatly simplifies the assembly of the heat exchanger.

BRIEF SUMMARY OF THE INVENTION

In accordance with a preferred embodiment of our invention, these and other objects are accomplished as follows. We employ an uncured EPDM polymer. EPDM polymers of a type presently commercially available are suitable. The polymer is mixed with suitable quantities of suitable fillers, such as carbon black, calcium carbonate, talc, silica, extender oils, antioxidants and the like. However, in accordance with the practice of our invention, a specific curing agent-coagent combination is employed to cure the elastomer. The curing agent is a peroxide and, preferably, dicumyl peroxide, and the coagent is N,N'-m-phenylene dimaleimide. This curing agent and coagent are thoroughly mixed with the other constituents of the polymer formulation.

In the assembly of the heat exchanger, for example, this composition may be molded in the form of a gasket against a surface of a previously molded glass-filled nylon tank. The formulation is heated to a suitable elevated temperature, for example, 200° C., to cure the elastomer. The thus formed gasket is tightly adherent to the nylon tank.

The assembly of the heat exchanger may then readily be continued by placing the nylon tank with its integral gasket against a complementary metal header, compressing the members together, and mechanically affixing the tank to the header with the gasket compressed therebetween.

These and other objects and advantages of our invention will become more apparent from the detailed description thereof which follows. Reference will be made to the drawings, in which.

DETAILED DESCRIPTION OF THE INVENTION

Figure 1:
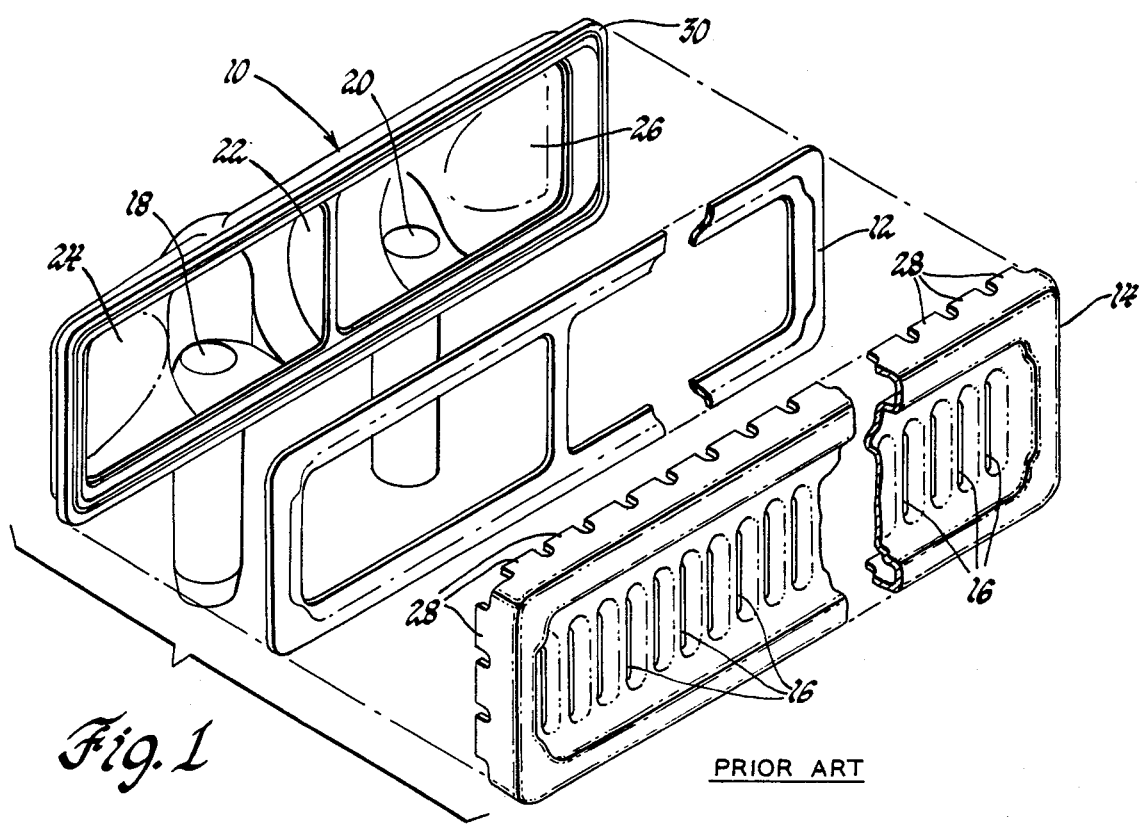
FIG. 1 is an exploded view of the prior art assembly of the separate molded nylon heat exchanger tank, transfer molded EPDM gasket, and aluminum tube header.

Referring to FIG. 1, a known hybrid material heat exchanger assembly includes an injection molded glass-filled nylon tank 10, a separate transfer molded EPDM rubber gasket 12, and an aluminum tube header portion 14. Tube header 14 is brazed or otherwise suitably attached to one end of each of a plurality of tubes (not shown). The tubes fit into slots 16 and may be provided with fins to improve the heat transfer from the heat exchanger to air or other fluid flowing outside the tubes. Typically, the other ends of the tubes are brazed to a like header which is also attached to a tank.

In automotive heat exchangers, typically an ethylene glycol-water mixture is the internal coolant fluid. The fluid enters and leaves the exchanger by way of an end tank such as that depicted at 10. From the tank, the fluid flows through tubes in which it is cooled. The tank 10 illustrated in FIG. 1 is provided with both an inlet port 18 and an outlet port 20. Partition 22 in the tank cooperates with the gasket and the header to divide the interior tank into an inlet section 24 and an outlet section 26. Thus, in this heat exchanger the flow of glycol would be in one direction through a portion of the tubes, and in the opposite direction through the others. However, the flow path in the heat exchanger is not an aspect of the invention. The invention pertains to bonding an EPDM gasket to a molded nylon tank.

It is apparent that the thin gasket plays a very important role in preventing leakage of the coolant between inlet 24 and outlet 26 sections and from the heat exchanger by flow between the tank 10 and the aluminum header 14. However, it is very difficult to position the flexible gasket and maintain it in position until the assembly can be completed and tabs 28 on the aluminum header crimped around the shoulder 30 on tank 10.

In accordance with the practice of our invention, we cure the EPDM sealant while it is in contact with the molded nylon body using dicumyl peroxide and N,N'-m-phenylene dimaleimide. A suitable gasket composition is as follows:

|  | Parts |
| --- | --- |
| Vistalon 2504 EPDM | 100 |
| N550 Carbon Black | 30 |
| Calcium Carbonate (e.g., Stan White 325) | 15 |
| Talc (e.g., Mistron Vapor) | 10 |
| Silica (e.g., Hi-Sil 215) | 10 |
| Paraffinic Oil (e.g., Sunpar 2280) | 30 |
| Zinc Oxide | 5 |
| Di-cup 40KE | 7 |
| AgeRite Resin D | 1 |
| HVA-2 | 2 |

Vistalon 2504 is an uncured EPDM material obtained from Exxon Chemical Company. It is representative of the type of curable EPDM formulations that may be used in the practice of this invention. Vistalon 2504 contains about 50% ethylene and is a medium level ENBcontaining polymer. The levels and selection of filler materials were adapted to the subject gasket application. This formulation is seen to contain carbon black, calcium carbonate, talc and silica. These materials affect the physical properties of the gasket composition. They may also play a secondary role in its adhesion to a molded nylon part. The zinc oxide, Di-cup 40KE and HVA-2 participate in the curing of the EPDM elastomer. The Di-cup 40KE is dicumyl peroxide supported on Burgess KE clay (39.5 to 41.5% active dicumyl peroxide). It is supplied by Hercules, Inc. HVA-2 is N,N'-m-phenylene dimaleimide. The use of the combination of dicumyl peroxide and the maleimide are essential in the practice of our invention.

The curing characteristics and the cured properties of the above formulation are as follows:

| Cure Time (t95) | |
| --- | --- |
| 204° C.: | 1.8 min. |
| 171° C.: | 10.0 min. |
| Tensile Strength: | 9.3 MPa |
| 100% Modulus: | 1.8 MPa |
| 200% Modulus: | 3.9 MPa |
| Elongation: | 345% |
| Hardness: | 50 Shore A |
| Tear Strength: | 21.3 kN/m @ Rm Temp |
|  | 8.3 kN/m @ 100° C. |
| Compression Set: (22 hrs. @ 150° C. under 25% compression) | 17% |
| Bonding Strength: | >6.4 kN/m |

Figures 2, 3:
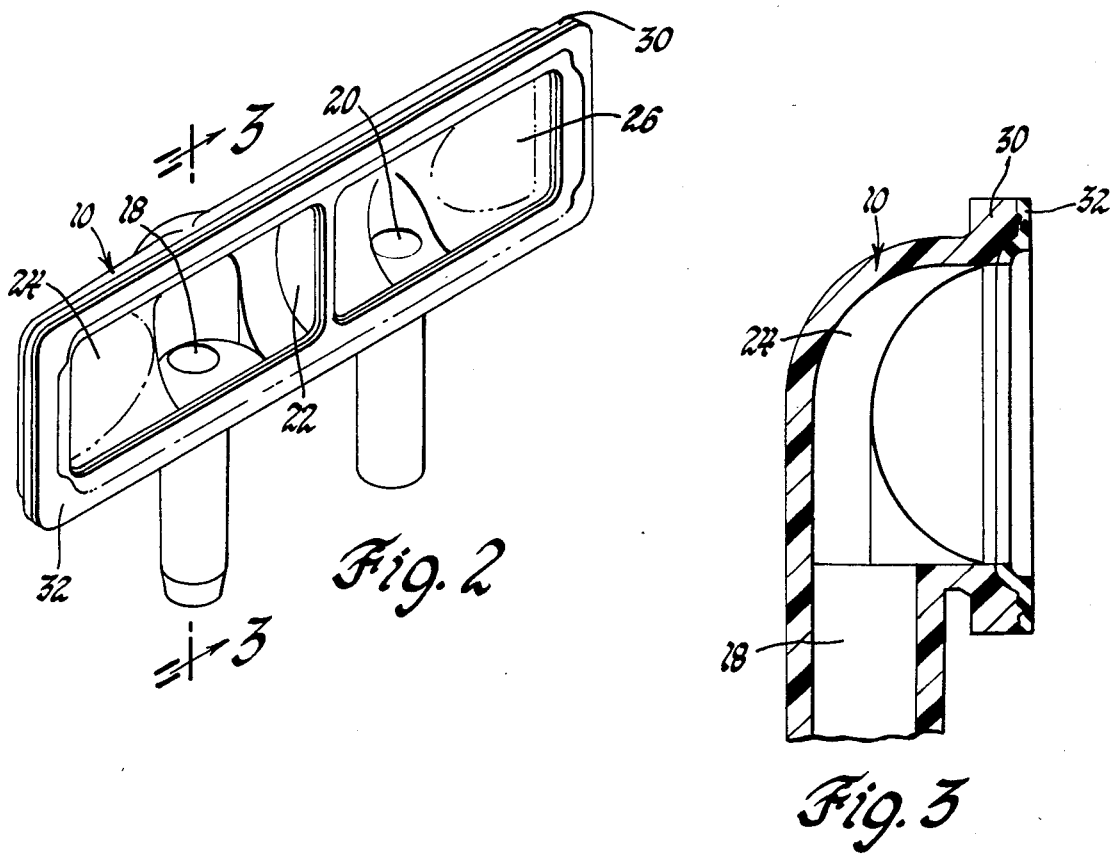
FIG. 2 is a perspective view of a molded glass-filled nylon heat exchanger tank with an integrally attached EPDM rubber gasket in accordance with this invention.
FIG. 3 is a sectional view of the tank and integral gasket taken along plane 3—3 of FIG. 2.

A heat exchanger tank, like that depicted at 10 in FIG. 1, was injection molded of nylon 6/6 filled with a nominal 33 parts of chopped glass fibers per hundred parts of resin. A two-part mold was then prepared to mold an EPDM gasket onto the filled nylon tank. The mold half defining the outside of the tank was the same as the corresponding injection molding tooling. The mold half defining the inside of the tank was machined to define the gasket against the appropriate portions of the tank. FIGS. 2 and 3 show a gasket 32 molded in place on a tank 10. The mold portions were heated at 350° F. A previously molded tank was preheated to 125° F. and placed in the molds. The mold halves were closed. The above EPDM composition was preheated to 150° F. and then molded against the appropriate surfaces of the tank, as illustrated in FIG. 2. The thickness of the gasket was about 1.5 mm. The tank and formulation were maintained in the heated mold for 2.25 minutes and then removed. The gasket material was fully cured and very tightly adherent to the molded nylon. At this point the assembly of the heat exchanger could have been continued by pressing the tube header against the EPDM gasket and crimping the tabs over the shoulder of the molded tank.

When EPDM compositions containing the peroxide-phenylene dimaleimide curing system are suitably cured, they are very tightly adherent to molded nylon. For example, the above formulation was applied in a thickness of about 1.5 mm to a nylon strip and cured. The adhesive strength of the bond was measured by a 90 degree stripping test in which the layers were separated at an edge and pulled apart by two gripping arms perpendicular to each other. The test was carried out at a rate of 508 mm per minute and the force required to affect the separation was greater than 6.4 kN/m. In contrast, a conventional sulfur-cured EPDM composition has no adhesive bonding at all. A peroxide-cured formulation has very little bonding strength if it does not include N,N'-m-phenylene dimaleimide as cocuring agent.

R. W. Tomlinson, in an article entitled "Improved Adhesion of EPDM Sulfur Vulcanizates to RFL-Treated Fabrics" in *Rubber Chemistry and Technology*, Vol. 55, pp. 1516–1530, tested a dicumyl peroxide cured EPDM (plus 5 phr chlorosulfonated polyethylene) formulation using trimethylol propane trimethacrylate as a coagent for bonding EPDM to nylon fabric. We prepared the formulation with our chemicals and tested it with the above testing method. The bonding strength was 0.4 kN/m.

We have also tested our above EPDM formulation using Vul-Cup®[α, α'-bis(t-butylperoxy) diisopropyl benzene] in place of dicumyl peroxide. The formulation was optimized for Vul-Cup. Nevertheless, the adhesive strength of the cured EPDM to nylon was substantially less (3.1 kN/m).

Our practice will bond EPDM formulations to nylon surfaces. Our immediate application is for the assembly of nylon-metal heat exchangers as described. We contemplate a practice in which the nylon tank is molded in a first molding stage. The mold portion defining the intended gasket surface of the tank is removed and a new mold member defining both the surface of the tank and the gasket is put in place. The subject EPDM material is then molded and cured against the still warm molded tank.

Obviously, other molding practices could be used to mold dicumyl peroxide-maleimide cured EPDM against nylon.

Our dicumyl peroxide-maleimide curing system was described in connection with a specific uncured EPDM terpolymer mixture. It is to be understood that the curing system is useful with peroxide curable EPDM terpolymers. Thus, the selection of the specific terpolymer or mixture of terpolymers may be made on the basis of the desired curing rate, viscosity or the like. Similarly, it should be understood that the selection of particular fillers, extender oils, antioxidants and other additives are at the discretion of the user, and in normal practice are not critical of the use of our invention. Thus, while our invention has been described in terms of a preferred embodiment thereof, it will be appreciated that other forms could readily be adapted by one skilled in the art. Accordingly, the scope of our invention is to be limited only by the following claims.

The embodiments of the invention in which an exclusive property or privilege is claimed are defined as follows:

1. A method of assembling a heat exchanger having a tube header mechanically attached to a molded nylon tank with a thermoset ethylene-propylene elastomer sealing gasket sandwiched therebetween, comprising
    applying an uncured thermosetting ethylene-propylene-diene elastomer composition on a nylon tank in the configuration of said gasket, said composition containing dicumyl peroxide and N,N'-m-phenylene dimaleimide as curing agents,
    heating the composition to cure it and form a cured elastomeric gasket adhering to said tank, and thereafter
    locating the tank against the header with the gasket in sealing position and attaching the tank to the header.

2. A method of assembling a heat exchanger having a tube header mechanically attached to a molded nylon tank with a thermoset ethylene-propylene elastomer sealing gasket sandwiched therebetween, comprising
    molding the nylon tank in a multipart mold, one of the mold parts defining the surface of the tank to be engaged by the gasket and adjacent tank surface,
    removing such mold part from against the molded tank and replacing it with a third mold part defining the gasket and adjacent tank surface such that the tank is then confined within a mold, and gasket cavity is defined,
    injecting uncured thermosetting ethylene-propylene-diene elastomer composition into the gasket cavity, said composition containing dicumyl peroxide and N,N'-m-phenylene dimaleimide as curing agents,
    heating the composition to cure it and form a cured elastomeric gasket adhering to said tank, and thereafter
    locating the tank against the header with the gasket in sealing position and attaching the tank to the header.

3. A method of bonding a curable ethylene-propylene-diene elastomer composition to a surface of a molded nylon article, comprising
    applying an uncured thermosetting ethylene-propylene-diene composition onto said surface, said composition containing curing constituents consisting essentially of dicumyl peroxide and N,N'-m-phenylene dimaleimide as curing agents and heating said composition to cure it and effect an adhesive bond between it and the molded nylon.

* * * * *